April 7, 1970   F. GROSS   3,504,701
VALVE ASSEMBLY AND METHOD OF INSTALLATION
Filed Nov. 22, 1967

INVENTOR
FRIEDRICH GROSS
BY
ATTORNEY

United States Patent Office 3,504,701
Patented Apr. 7, 1970

3,504,701
VALVE ASSEMBLY AND METHOD OF
INSTALLATION
Friedrich Gross, Bergfeld, Germany, assignor to Westinghouse Bremsen- und Apparatebau, G.m.b.H., Hannover, Germany
Filed Nov. 22, 1967, Ser. No. 685,200
Claims priority, application Germany, Dec. 15, 1966, W 38,701
Int. Cl. B21d 53/00; F16k 17/04
U.S. Cl. 137—540                   8 Claims

ABSTRACT OF THE DISCLOSURE

A valve assembly in which a pair of valve housing segments are assembled in axial abutment to preload the spring of a spring-biased check valve enclosed therebetween, and are simultaneously fixedly installed as a valve assembly in a bore in a housing by means of a radially outwardly extending flange on the abutting end of each segment, one or both of the flanges being sloped toward the other so as to be radially spaced relative to a counterbore and to axially abut the shoulder between bore and counterbore, and upon further insertion of the segments in the bore by application of axial force on the outermost member, the flange or flanges will bend to a position perpendicular to the axis of the housing segments thereby moving the segments toward one another to compress the spring and simultaneously enlarging the flange periphery into tight radial engagement with the counterbore to fixedly install the segments in the bore in axially assembled relationship.

---

Figure 1:
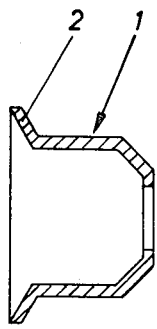

Heretofore, in valve assemblies adapted for fixed installation in the housing of another device, the valve assemblies included a relatively large number of costly pieces which, upon malfunction of the valve assembly, were disassembled to effect repair or replacement of parts. This need for disassembly required separate means adapted to removably install the valve assembly in the housing of the supporting device.

It is the object of the present invention to provide a valve assembly comprised of a minimum number of inexpensive parts which may be quickly and easily assembled and simultaneously, fixedly installed in a bore in the supporting housing of the other device by the simple expedient of forcefuly inserting the loosely assembled valve assembly in the housing, so that upon malfunction the valve assembly may be removed from the support housing by destruction and replaced by another valve assembly at a cost less than that required to remove, disassemble, repair, reassemble and reinstall previous valve assemblies of the type including a larger number of costly parts removably installed in a supporting housing.

In the present invention, this object is achieved by forming the valve housing in two generally cup-shaped, housing segments which are assembled to form a hollow valve housing by coaxially abutting the open ends of the segments. Each segment includes a coaxially disposed port in the closed end thereof, with either port serving as a fluid pressure inlet and with the other port serving to exhaust fluid pressure from the assembled housing. Each segment includes on the open end thereof a flange radially extending outwardly and axially sloped toward the other so that when one segment is inserted ported-end first with clearance in a bore in a supporting housing, and when the other segment is inserted flange first in the same bore in tandem therewith, the flanges are juxtaposed and inserted with radial clearance in a counterbore until the flange on the one segment axially engages the shoulder between the bore and counterbore, and the flanges axially abut at their outer periphery only. The segments are composed of a malleable sheet material, such as tin or tin alloy, so that the application of an axial force to the outer segment compreses the flanges against the shoulder and against each other, thereby bending the flanges relative to the cup-shaped portion from their sloped position to a position perpendicular to the axis of the segment and in flush parallel engagement with one another thereby enlarging the flange peripheries into tight radial engagement with the counterbore, thus fixedly anchoring the segments in axial abutment with one another and simultaneously fixedly installing the assembled segments in the bore. The valve structure internally of the segments comprises a check valve member disposed in the one segment to close the inlet port, and a spring coaxially disposed relative to the segments, one end of which engages the check valve to close the inlet port, and the other end of which is concentrically seated around the exhaust port in the other segment.

In assembling the valve and installing the same in the bore, the valve, spring and housing elements may be assembled before insertion in the bore, or, the valve assembly may be inserted piecemeal in the bore. In either method of inserting the valve assembly in the bore, when the segments are loosely installed in the bore with the valve member and spring enclosed therebetwen, the above-described application of axial force on the outermost segment to bend the flanges not only locks the segments to each other and to the bore, but simultaneously moves the segments toward one another a distance equal to that of the axial bending movement of the flanges relative to the segments to thereby compress the spring to preload the valve member.

Figure 2:
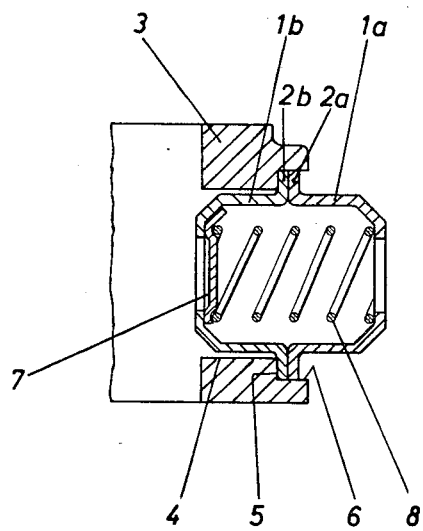

This and other objects of the invention will become more readily apparent in the following description, taken with the drawing, in which:

FIG. 1 is a sectional view of a valve housing segment of the valve assembly portion of my invention, shown in the preassembly condition; and FIG. 2 is a sectional view of the valve assembly as installed in a support housing.

Referring now to FIG. 1 of the drawing, there is shown a generally cup-shaped valve housing segment 1, representing one of an identical pair of valve housing segments, which when assembled with their open ends in coaxial abutment, comprise a valve housing. The closed end of each of the cup-shaped segments includes a coaxial port, one port serving as a fluid pressure supply inlet and the other serving as an exhaust when the segments are assembled and installed in the manner hereinafter described relative to FIG. 2 of the drawing. The open end of each housing segment includes a radially outwardly extending flange 2 having a preassembly conical form integral with the segment 1 and angularly sloped relative to the segment axis so that the wider end of each flange extends toward the wider end of the other flange when the pair of segments are coaxially disposed with their open ends coadjacent.

In order that the flanges may bend at the junction thereof with the main body of the housing segment, for purposes hereinafter described, so as to assume the postassembly form of a flat ring lying in a plane perpendicularly disposed relative to the segment axis, and thereby enlarge the outer circumference of the flange, the housing segments are comprised of a suitable malleable sheet material, such as, for example, tin or tin alloy.

Referring now to FIG. 2 of the drawing, there is shown a valve assembly comprised of a pair of assembled housing segments 1a and 1b of the type above described and coaxially abutted at their open ends to form a valve housing installed in the supporting housing 3 in a bore 4 having a radial shoulder 5 disposed between bore 4 and a counterbore 6. The bore 4 and counterbore 6 comprise a vent passage communicating an interiorly disposed fluid passage with atmosphere.

The housing segment 1b is axially disposed with radial clearance in bore 4, with its flange 2b bent to the above described post-assembly condition in axial engagement with shoulder 5 and in tight radial engagement with counterbore 6. The housing segment 1a is axially disposed in counterbore 6 with flange 2a in the above-described post-assembly position in axial tight engagement with flange 2b and in radial tight engagement with counterbore 6. Enclosed within the housing segments 1a and 1b are a vent valve 7 for internally closing the inlet port in segment 1b, and a spring 8 biasing the vent valve to close the inlet port, with one end of the spring engaging the vent valve 7, and with the other end engaging the closed end of segment 1a in concentric relationship with the exhaust port.

In now describing the method of assembling the valve assembly and installing the same in housing 3, it is to be understood that when flange 2 is in the conical preassembly position as illustrated in FIG. 1, the outer circumference thereof is less than that of counterbore 6 providing radial clearance therebetween to permit quick and easy insertion of the segments in the bore 4. It is also to be understood that when flange 2 is bent to assume the post-assembly position illustrated by flanges 2a and 2b in FIG. 2, after the flanges are disposed in counterbore 6, the outer circumference thereof is enlarged as the flange is bent so as to radially engage counterbore 6 with a tight radial clamping force when the flange is fully disposed in the post-assembly position shown in FIG. 2. This being the case, it is seen that a housing segment 1b having its flange 2b predisposed in the preassembly conical position as illustrated in FIG. 1 may be quickly and easily inserted ported-end first in bore 4 until the narrower end of flange 2b axially engages shoulder 5. Thereafter, valve member 7 and spring member 8 are disposed therein in the relative positions shown in FIG. 2, and housing segment 1a having its flange 2a also disposed in the pre-assembly position of FIG. 1 is easily and quickly inserted flanged-end first in counterbore 6 until the outer periphery of flange 2a engages the outer periphery of flange 2b. At this point, the valve assembly is partially assembled and loosely installed in housing 3, the flanges 2a and 2b are still in the preassembly position of FIG. 1, and the spring is under no compression or under slight compression, as desired, depending upon the spring structure and desired final preloading thereof. An axially inward force now applied to housing segment 1a is opposed by the lip of fixed shoulder 5 engaging flange 1b near the junction thereof with segment 1b, and, since the outer peripheries of the flanges 2a and 2b are already engaged, each flange applies a bending moment of force to the other, effecting a substantially simultaneous bending of the flanges from the preassembly position of FIG. 1 to the post-assembly position of FIG. 2, thereby simultaneously compressing spring 8 to the final preloading, fixedly assembling housing segments 1a and 1b in correlative axial abutment, axially seating the assembled segments 1a and 1b against shoulder 5 to seal bore 4, and fixedly installing the so-assembled segments 1a and 1b in bore 4 of the housing 3.

If desired, flange 2b on housing segment 1b may be preformed to radially extend perpendicularly to the axis of housing segment on a circumference less than that of counterbore 6 to permit easy insertion thereof in bore 4. This construction eliminates the need for bending of flange 2b so that less axial force is required on housing segment 1a to effect the finally assembled and finally installed position shown in FIG. 2. By this construction, housing segment 1b is fixedly disposed in bore 4 by the resultant clamping of flange 2b between shoulder 5 and radially clamping flange 2a.

Having now described the invention, what I claim as new and desire to secure by Letters Patent is:

1. A valve assembly for installation in a bore in a supporting housing, said bore having a counterbore forming a radial shoulder therebetween, said valve assembly comprising:
   (a) a valve housing comprising a pair of separate cup-shaped segments each having a port in the closed end thereof and a radially outwardly extending flange on the open end thereof, which segments, when coaxially assembled in flange-engaging relationship, are freely insertable in said bore with the flange of the first inserted segment in axial engagement with said shoulder and radially spaced from said counterbore;
   (b) the flange of the last inserted segment having a first position canted relative to the axis of said last inserted segment to enter said counterbore with radial clearance, and bendable relative to said axis, upon the application of axial force to said last inserted segment as opposed by said shoulder and the flange of said first inserted segment, to a second position perpendicular to said axis to radially clamp said flange of said last inserted segment in said counterbore; and,
   (c) valve means disposed within the assembled housing segments.

2. A valve assembly for installation in a bore in a supporting housing, said bore having a counterbore forming a radial shoulder therebetween, as recited in claim 1, in which said cup-shaped segments are comprised of malleable sheet material.

3. A valve assembly for installation in a bore in a supporting housing, said bore having a counterbore forming a radial shoulder therebetween, as recited in claim 1, in which said cup-shaped segments and said flanges thereon are identical.

4. A valve assembly for installation in a bore in a supporting house, said bore having a counterbore forming a radial shoulder therebetween, as recited in claim 1, in which said valve means comprises:
   (a) a valve member disposable within one of said cup-shaped segments, and;
   (b) a spring member compressible between said valve member and the other of said cup-shaped segments to bias said valve member to close said port in said one segment when said pair of segments are fixedly assembled in said bore.

5. A combined valve assembly and supporting housing therefore, comprising:
   (a) a supporting housing having a bore therein communicating with fluid passage means in the housing;
   (b) said bore having a counterbore forming a radial shoulder between said bore and said counterbore;
   (c) a valve housing comprising a pair of separate cup-shaped segments each having a port in the closed end and a radially outwardly extending flange on the open end, which segments are coaxially assembled in flange-engaging relationship, in said bore with the flange of the first inserted segment in axial engagement with said shoulder;
   (d) the flange of the last inserted segment having a first position canted relative to the axis of said last inserted segment to enter said counterbore with radial clearance and bent relative to said axis, in response to the application of axial force to said last inserted segment opposed by said shoulder and the flange of said first inserted segment, to a second position perpendicular to said axis radially clamping said flange of said last inserted segment in said counterbore; and
   (e) valve means disposed within the assembled housing segments.

6. A method of assembling and fixedly installing a valve assembly in a supporting housing; comprising:
  (a) preforming from malleable sheet material a pair of cup-shaped housing segments, each segment having a port in the closed end thereof and a radially outwardly extending flange on the open end thereof, one flange being conical in form and extending axially beyond the housing segment to which it is attached;
  (b) loosely assembling and loosely installing said pair of housing segments in a bore in said supporting housing with valve means disposed between said pair of housing segments, in which loose assembly and loose installation the other of said segments is inserted with clearance ported-end first in the bore with its flange axially engaging a shoulder between said bore and a counterbore and radially spaced relative to the counterbore, and in which said one segment is inserted conical flange first in said counterbore with said conical flange axially engaging the flange of said other segment and radially spaced relative to said counterbore;
  (c) simultaneously finally assembling and finally installing said assembly in said bore by applying a force axially of said one segment sufficient to move said segments coaxially toward one another to bend said conical flange axially of said one segment flattening said conical flange into a diametrically enlarged flat ring radially clamped in said counterbore.

7. A method of assembling and fixedly installing a valve assembly in a supporting housing, as recited in claim 6, in which a spring comprising a part of said valve assembly is preloaded by:
  (a) inserting said spring between said housing segments in coaxial engageable relationship therewith while loosely assembling and loosely installing said segments and said valve assembly in said bore, and
  (b) compressing said spring to preloaded condition by said simultaneously finally assembling and finally installing said valve assembly in said bore.

8. A method of assembling and fixedly installing a valve assembly in a supporting housing, as recited in claim 6, by:
  (a) preforming said flange on said other housing segment in a conical form identical to that of said flange on said one housing segment;
  (b) simultaneously finally assembling and finally installing said assembly in said bore by applying a force axially of said one segment as opposed by said shoulder sufficient to move said segments coaxially toward one another to bend each conical flange axially of the housing segment to which each flange is connected, flattening each said conical flange into a diametrically enlarged flat ring radially clamped in said counterbore.

References Cited

UNITED STATES PATENTS 1,784,822   12/1930   Crowley _____ 137—540 X
2,672,009   3/1954   Hense et al. _____ 137—540 X WILLIAM F. O'DEA, Primary Examiner D. J. ZOBKIW, Assistant Examiner U.S. Cl. X.R.

29—157, 157.1